(12) United States Patent
Rasmussen

(10) Patent No.: US 7,014,502 B2
(45) Date of Patent: Mar. 21, 2006

(54) RF FEEDTHROUGH COAXIAL CONNECTOR FOR WIRELESS COMMUNICATIONS IN HAZARDOUS ENVIRONMENTS

(75) Inventor: C. Edward Rasmussen, Reynoldsburg, OH (US)

(73) Assignee: AnLynk Wireless, LLC, Columbus, OH (US)

( * ) Notice: Subject to any disclaimer, the term of this patent is extended or adjusted under 35 U.S.C. 154(b) by 0 days.

(21) Appl. No.: 10/817,503

(22) Filed: Apr. 2, 2004

(65) Prior Publication Data

US 2004/0194994 A1 Oct. 7, 2004

Related U.S. Application Data

(60) Provisional application No. 60/460,725, filed on Apr. 4, 2003.

(51) Int. Cl.
*H01R 9/05* (2006.01)
*H02G 15/02* (2006.01)

(52) U.S. Cl. .................. 439/578; 439/916; 439/936
(58) Field of Classification Search ............... 439/578, 439/736, 559, 936; 174/52.2, 93, 65 R, 76, 174/151, 152 R, 153 A
See application file for complete search history.

(56) References Cited

U.S. PATENT DOCUMENTS

| | | | | |
|---|---|---|---|---|
| 2,827,509 A | * | 3/1958 | Wayman | 174/77 R |
| 3,566,334 A | * | 2/1971 | Ziegler | 439/248 |
| 3,783,434 A | * | 1/1974 | Ransford, III | 439/281 |
| 3,877,777 A | * | 4/1975 | Glenn, Jr. | 359/202 |
| 4,266,844 A | * | 5/1981 | Chelminski | 439/460 |
| 4,329,540 A | * | 5/1982 | Howarth | 174/153 R |
| 4,408,176 A | * | 10/1983 | Nakamura | 336/107 |
| 4,656,313 A | * | 4/1987 | Moore et al. | 174/35 R |
| 4,927,386 A | * | 5/1990 | Neuroth | 439/589 |
| 5,773,759 A | * | 6/1998 | Hablutzel | 174/65 R |
| 6,067,395 A | * | 5/2000 | Cairns et al. | 385/138 |
| 6,147,308 A | * | 11/2000 | Santagata | 174/75 R |
| 6,232,554 B1 | * | 5/2001 | Yamazaki et al. | 174/65 SS |
| 6,326,550 B1 | * | 12/2001 | Dyer et al. | 174/93 |
| 6,617,512 B1 | * | 9/2003 | Roques | 174/65 R |

* cited by examiner

Primary Examiner—Neil Abrams
(74) Attorney, Agent, or Firm—Frank H. Foster; Kremblas, Foster, Phillips & Pollick

(57) ABSTRACT

A coaxial feedthrough connector for connecting an RF signal through a wall in a hazardous environment and particularly to an antenna. The connector has a base with an axial passage. A coaxial transmission line extends through the passage and a nonconductive, preferably silicone sealing compound fills at least a longitudinal segment of the passage and sealingly engages both the transmission line and the interior surface of the passage. A sealant is used that is approved for use at the location in a hazardous environment where it will be used.

11 Claims, 3 Drawing Sheets

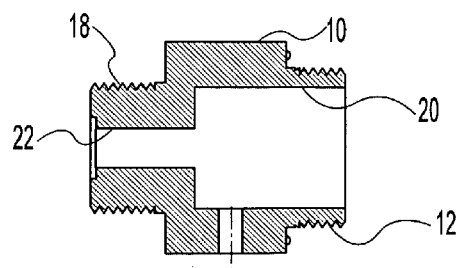
Fig. 3
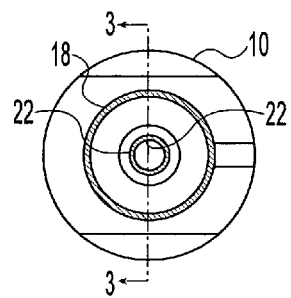
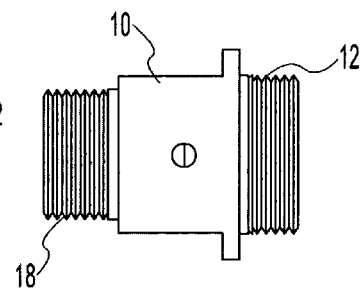
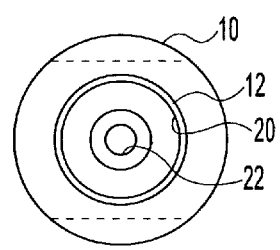
Fig. 5    Fig. 4    Fig. 6
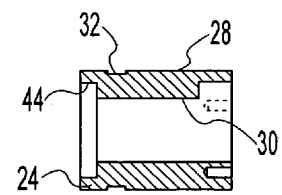
Fig. 7
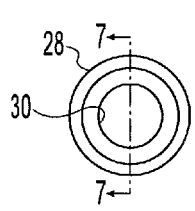
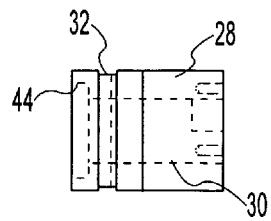
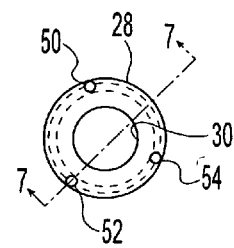
Fig. 9    Fig. 8    Fig. 10

RF FEEDTHROUGH COAXIAL CONNECTOR FOR WIRELESS COMMUNICATIONS IN HAZARDOUS ENVIRONMENTS

CROSS-REFERENCE TO RELATED APPLICATIONS

This application claims the benefit of U.S. Provisional Application Ser. No. 60/460,725 filed Apr. 4, 2003.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to electronic equipment adapted for use in environments which are hazardous because of the presence of flammable gases, more particularly relates to an RF feedthrough connector or sealing fitting for use with explosion proof enclosures, and most particularly is directed to a compact antenna and feedthrough assembly which is leakproof and therefore can be mounted near the hazard to facilitate wireless data communication with the hazardous site.

2. Description of the Related Art

Areas near or surrounding facilities for the manufacture, storage, transportation, or use of flammable materials are hazardous environments because of the possibility of accidental leakage and ignition by a spark or flame in the environment. Consequently, there are regulations and standards of construction for buildings and equipment in order to minimize the associated risks and make them explosion proof. Explosion proof means that they will not cause an explosion and, if one occurs within an explosion proof enclosure, it will be safely contained and the pressure safely relieved. The regulations include sealing requirements so that hazardous gases cannot reach an electric arc or spark and thereby ignite a fire.

The most common method to isolate a potential ignition source in a hazardous location is through the use of an explosion proof enclosure rated as NEMA 7, 8, 9, or 10 which is strong enough to withstand the pressure of an explosion in the interior of the enclosure. Such an enclosure must be designed to safely vent the hot gases resulting from an explosion in a way that the gases are cooled below the ignition temperature of an explosive mixture outside the enclosure. In order to contain the pressures of an internal explosion, the enclosure is typically constructed of heavy cast steel or aluminum. Areas around various hazardous installations are ranked, based on distance, such as Class 1/Division 1 and the closer equipment is located to the hazard, the more rigorous are the regulations. There are regulations for electronic equipment, which must meet the rating standards for the place where it is located.

Often it is desirable to have wireless monitoring and control systems associated with equipment in hazardous environments such as oil rigs, fuel or other flammable-containing tanks or power plants. A wireless system avoids the need for installing long wires or transmission lines. However, a wireless system requires at least one antenna which is used for wireless data transmission to and from the monitoring and control equipment. Unfortunately, a wireless antenna can not be located within the explosion proof enclosure because the metal enclosure would shield the antenna and prevent transmission of the electromagnetic waves to a remote antenna in communication with the monitoring and control system.

It would be desirable to attach the antenna to the exterior of the explosion proof enclosure to permit radio communication. However, the use of RF transmitters in a hazardous or potentially explosive environment could cause a spark and/or a flame path out of instrument housing containing a transmitter or transceiver and associated instruments. Currently, no antenna is rated for Class 1, division 1, which is a location close to the hazard. The result is that, in the prior art, coaxial cable must extend to a location far enough away from the hazard that an available antenna that will meet the standards for the greater distance can be used.

The use of wireless monitoring and control systems in hazardous environments has always presented a problem. The exposed antenna creates a series of problems since, in the prior art, the typical antenna is attached to a coaxial connector outside of the explosion proof enclosure and is displaced a substantial and sufficient distance from the hazard and from the explosion proof enclosure that it will meet the less restrictive regulations and standards for the greater distance. Some manufacturers of wireless data systems have utilized a conduit with a sealed conduit fitting and having a coaxial connector at one end for the antenna connection and a ¾" NPT thread at the other end. The sealed fitting utilizes a combination of both fibrous packing and sealing compound to seal the connector and coaxial cable allowing the fitting to be attached to the enclosure and allowing for a length of cable and a coaxial connector to be connected at one end to the transmitter inside the enclosure and at the other end to the antenna displaced from the enclosure.

It is an object and feature of the present invention to provide an explosion proof structure which permits an antenna for a wireless system to be attached directly to the explosion proof enclosure or pipe so that it can be located nearer to the hazard, avoid the need for long lengths of transmission line extending a greater distance from the hazard and yet could be certified by one or more of the licensing agencies for use close to the hazard.

It is a further object and feature of the invention to provide an antenna having an antenna/cable interface entering the explosion proof enclosure that has a sealing process and structure that does not allow the hot gases to be able to escape from the explosion proof enclosure through this path so that it maintains the explosion proof integrity of the enclosure.

It is a further object and feature of the invention to provide a coaxial cable connector for feeding through the wall of the explosion proof enclosure that has the above properties and can be used to connect to a coaxial cable on opposite sides of the wall of the explosion proof enclosure, instead of being connected on one side to an antenna, so that it may be used for a transmission line feedthrough or bulkhead connector were desired.

It is a further object and feature of the invention to provide a coaxial connector interface that may be connected to a pipe or housing containing the coaxial cable carrying the RF signal to an antenna. The interface is sealed in such a manner as to withstand the pressure of an explosion inside an instrument housing containing a RF transmitter or transceiver preventing hot gases from escaping through the antenna connection. The RF radiating element is DC grounded to prevent a potential spark that could take place at the radiating element.

BRIEF SUMMARY OF THE INVENTION

The invention is a coaxial feedthrough connector for connecting an RF signal through a wall in a hazardous environment. The connector has a base with an axial passage defined by a passage interior surface. A coaxial transmission line extends through the passage and a nonconductive sealing compound, filling at least a longitudinal segment of the passage, is sealingly engaged to both the transmission line and to the passage surface.

BRIEF DESCRIPTION OF THE SEVERAL VIEWS OF THE DRAWINGS

FIG. 3 is a view in axial cross section taken substantially along the line 3—3 of FIG. 5 and illustrating the outer antenna base member of the embodiment of FIGS. 1 and 2.

FIG. 4 is a side view of the outer base member of FIG. 3.

FIG. 5 is a left end view of the outer base member of FIG. 3.

FIG. 6 is a right end view of the outer base member of FIG. 3.

FIG. 7 is a view in axial section taken substantially along the line 7—7 of FIG. 9 and illustrating the brass insert of the embodiment of FIGS. 1 and 2.

FIG. 8 is a side view of the brass insert of FIG. 7.

FIG. 9 is a left end view of the brass insert of FIG. 7.

FIG. 10 is right end view of the brass insert of FIG. 7.

FIG. 11 is a view in side elevation of an alternative embodiment of the invention comprising a coaxial transmission line feed through.

Figure 1:
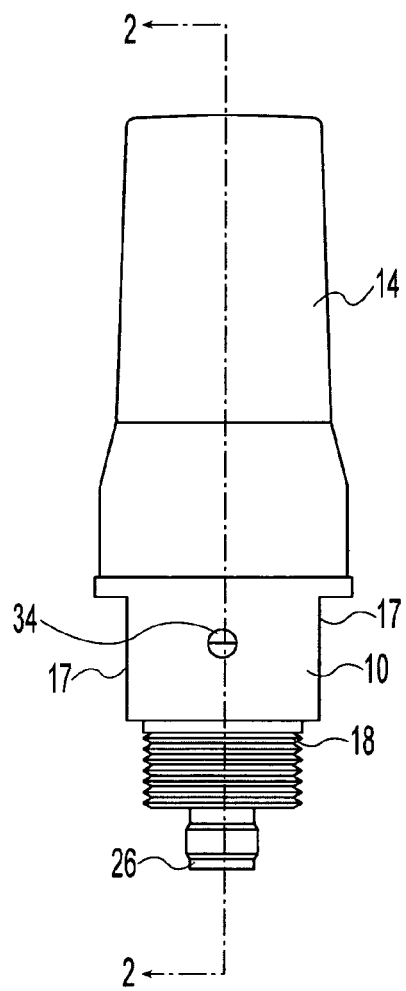
FIG. 1 is a view in side elevation of an antenna including a coaxial feedthrough connector embodying the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 2:
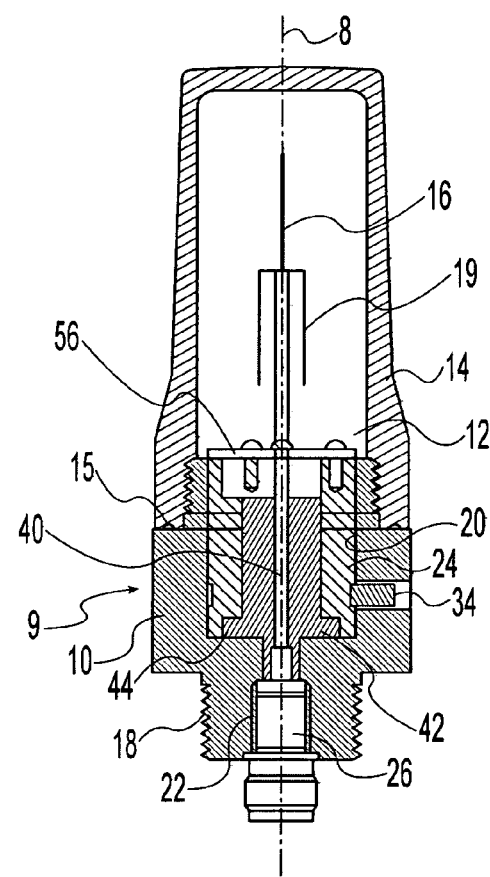
FIG. 2 is a view in axial cross section taken substantially along the line 2—2 of FIG. 1.

FIGS. 1 and 2 illustrate the preferred embodiment of the invention. The structure is principally symmetrical about its longitudinal axis 8 with most of its structural features being cylindrical. It provides an external, 800 MHz to 6 GHz antenna for a flameproof housing. The antenna is somewhat similar to a MOBILE MARK, Body Mount 2.4 GHz ½ wave antenna with a gain of 2.5 dBi Such an antenna is small and ruggedly constructed. However, it is modified in accordance with the invention.

More specifically, the preferred embodiment has a base 9 which, in the preferred embodiment, comprises an outer base member 10 and an insert 24. The outer base member is illustrated in more detail in FIGS. 3–6. The outer base member 10 has a threaded boss 12 at one end which threadedly engages a non-ferromagnetic radome 14 for the conventional purpose of protecting the radiating antenna element 16 and preventing contact with it. A gas tight seal is unnecessary between the radome 14 and the outer base member 10 but, preferably, an O-ring 15 forms a seal between the radome 14 and the base 9. The opposite end of the outer base member 10 has a threaded boss 18, forming a ¾" NPT fitting, for threadedly engaging the explosion proof enclosure using a hub located on the top of the enclosure or a ¾" pipe which is attached to enclosure. The outer base member 10 is preferably manufactured from nickel plated brass. The exterior surface of the outer base member 10 is formed with two opposite, parallel planar surfaces or flats to provide an external peripheral surface 17 for engaging a wrench to ease installation of the assembly onto the enclosure or pipe.

The outer base member 10 also has a first cylindrical bore 20 and a coaxial second, and smaller, cylindrical axial bore 22. The brass insert 24 is matingly received within the first bore 20 with an interference, press fit. A conventional TNC coaxial transmission line connector 26 is threadedly engaged in the second cylindrical bore 22. The brass insert 24 is illustrated in more detail in FIGS. 7–10. It has a cylindrical outer wall 28 and a coaxial, cylindrical interior passage 30. It also has an annular, peripheral groove 32 for engagement by a set screw 34 to retain the brass insert 24 within the first bore 20.

The interior passage 30 of the insert 24 together with the second bore 22 of the outer base member 10 form a passage through the base 9 defined by the interior surface of those component passages. This passage is substantially parallel to the axis of the base and preferably is concentric with that axis.

A central coaxial transmission line 40 extends through this interior passage and is electrically connected to the TNC connector 26. This central coaxial transmission line 40 may have its central conductor extend into the radome to form an antenna radiating element or a separate radiating element may be connected to the central coaxial transmission line 40. The illustrated radiating elements are an upstanding conductor 16 electrically connected to the central conductor of the transmission line 40 and a second radiating element 19 folded back and electrically connected to the outer conductor of the transmission line 40.

A non-conductive sealing compound 42 is filled within the passage, and particularly within the passage 30 of the brass insert 24. The sealing compound 42 not only fills the passage but it is sealingly engaged to both the central coaxial transmission line 40 within the passage and to the interior surfaces forming the passage. Preferably, the sealing compound also extends into the second, smaller bore 22 and into sealing engagement with the TNC connector 26. This ensures the seal between the outer base member 10 and the TNC connector 26 to prevent leakage to the outside world. The preferred sealing compound is a silicone sealant and most preferably a two part, GE-RTV-627 potting and encapsulating compound sold under the trade name ADALET ADASEAL. This sealant has been found to possess the necessary strength and flame proof characteristics and cures better and at higher temperatures and has been approved by UL for explosion proof applications.

It is desirable, though not necessary in every case, that the antenna have a DC grounded antenna for the conventional purpose because it is the DC that poses a known spark hazard. The DC ground can be provided by an RF choke physically mounted to a PC board and making a dc short but RF open circuit across the antenna in order to prevent the DC spark hazard. Because the RF choke and the PC board are prior art technology, they are not illustrated with any detail. A round circuit board 56 contains the radiating element was designed with a surface mount RF choke on the top side of the circuit board. This assembly can be attached to the top of the brass insert 24 using three screws into 3–48 tapped holes 50, 52 and 54

The preferred embodiment illustrated in FIGS. 1–10 is typically assembled by attaching the coaxial transmission line 40 to the TNC connector, pressing the insert 24 into the larger bore 20 of the outer base member 10 and then inserting the attached TNC connector and transmission line 40 into the smaller bore 22. The sealant is then forced through a mixing nozzle into the radome end of the larger bore 20 (prior to attachment of the radome). The sealant is forced into the smaller bore 22 into sealing engagement with the TNC connector 26 and into an interior, annular shoulder 44 formed in the insert 24 adjacent the central passage 22 of the outer base member 10. This shoulder 44 acts as a mold wall to form an annular flange within the annular shoulder 44 on the exterior of the solidified sealant 42. This annular flange increases the sealant sealing area between the insert 24 and the outer base member 10 to improve the seal.

An important feature of the invention is the sealant around the transmission line formed within the base 9. This feature can be used not only for a direct antenna feed through as illustrated and described above but also can be used for an RF feed through where a coaxial cable or transmission line is connected to both ends of an RF connector mounted in a wall. An RF feed through is essentially an RF transmission line path from one side of a barrier or wall, such as the cabinet for equipment, to the other side. It is also known as a bulkhead connector.

Figure 11:
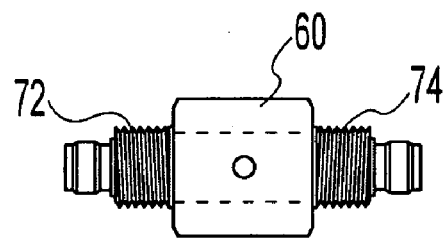
Figure 12:
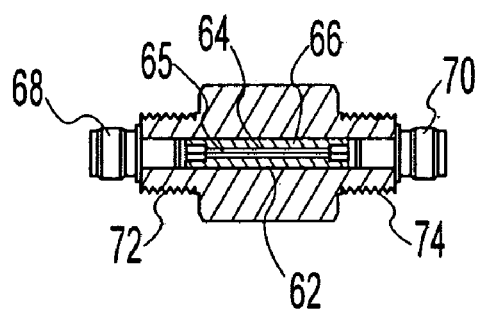
FIG. 12 is a view in axial cross section taken substantially along the line 11—11 of FIG. 13.
Figure 13:
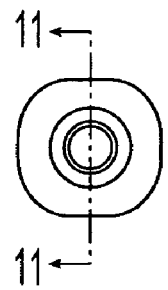
FIG. 13 is an end view of the embodiment of FIG. 11.

FIGS. 11–13 illustrate a feed through embodying the invention. It has a base 60 with a central passage 62. Positioned within the central passage 62 is a semi-rigid, tin plated coaxial cable 64 having a central conductor 65. A sealing compound 66 is filled within the passage 62 and is sealingly engaged to the walls of the passage 62 and to the central conductor 65. The sealing compound is preferably the same as described above. TNC connectors 68 and 70 are threadedly engaged in the opposite ends of the central passage 62 and electrically connected to the coaxial cable 64. Threaded bosses 72 and 74 are formed at the opposite ends for connection to a wall or bulkhead.

There are at least two types of coaxial transmission lines or coaxial cable which can be used embodiments the embodiments of the invention. Both have a central wire, Teflon or other plastic material around that, and an outer, cylindrical conductor around that. One type has a mesh outer tubular conductor having a tubular insulator over that, typically an outer flexible plastic insulator. The other type has a semi-rigid (solid) outer, tubular conductor. The semi-rigid coaxial cable is preferred because the sealant seats and sealingly bonds against it easily. The semi-rigid coaxial transmission line does not require that an outermost insulator be stripped off before the sealant is applied. However, the mesh type can be used, though its outer insulating layer should be stripped off and care must be taken to assure sealing contact with its mesh outer conductor.

While certain preferred embodiments of the present invention have been disclosed in detail, it is to be understood that various modifications may be adopted without departing from the spirit of the invention or scope of the following claims.

The invention claimed is:

1. A coaxial feedthrough connector for connecting an RF signal through a wall in a hazardous environment, the connector comprising:
    (a) a base having an axial passage defined by a passage interior surface, the base having a threaded boss extending from the base coaxially with the passage for connecting the base to the wall or to a conduit connected to the wall;
    (b) a coaxial transmission line extending through the passage;
    (c) a nonconductive sealing compound filling at least a longitudinal segment of the passage and sealingly engaged to both the transmission line and to the passage surface; and
    (d) a coaxial connector mounted in an end of the passage for connection to a coaxial cable, the coaxial connector being electrically connected to the transmission line.

2. A connector in accordance with claim 1 wherein a radome is mounted on the base opposite the boss and an antenna radiating element is mounted within the radome and is electrically connected to the transmission line.

3. A coaxial feedthrough connector for connecting an RF signal through a wall in a hazardous environment, the connector comprising:
    (a) a base having an axial passage defined by a passage interior surface, the base comprising an outer base member and a coaxial insert mounted in a coaxial bore formed in the outer base member, the coaxial insert having a central passage coaxial with a central passage in the outer base member, the central passages being contiguous and together forming said axial passage;
    (b) a coaxial transmission line extending through the passage; and
    (c) a nonconductive sealing compound filling at least a longitudinal segment of the passage and sealingly engaged to both to transmission line and to the passage surface
    wherein the central passage of the outer base member is smaller than the central passage of the insert and a coaxial cable connector is engaged in the end of the smaller central passage, and wherein the sealing compound extends into sealing contact with the coaxial cable connector.

4. A connector in accordance with claim 3 wherein an interior, annular shoulder is formed in the insert adjacent the central passage of the outer base member for increased sealant sealing area between the insert and the outer base member.

5. A connector in accordance with claim 4 wherein the base has a threaded boss extending from the base and coaxially with the passage for connecting the base to the wall or to a conduit connected to the wall.

6. A connector in accordance with claim 5 wherein a radome is mounted on the base opposite the boss and an antenna radiating element is mounted within the radome and is electrically connected to the transmission line.

7. A connector in accordance with claim 6 wherein the sealing compound is a silicone sealing compound.

8. A connector in accordance with claim 7 wherein the silicone sealing compound is a two part, GE-RTV-627 compound.

9. A coaxial feedthrough connector for connecting an RF signal through a wall in a hazardous environment, the connector comprising:

(a) a base having an axial passage defined by a passage interior surface;
(b) a coaxial transmission line extending through the passage; and
(c) a nonconductive sealing compound filling at least a longitudinal segment of the passage and sealingly engaged to both the transmission line end to the passage surface, wherein a coaxial boss is formed at each opposite end of the base, a coaxial cable connector is mounted in the boss at each end of the passage and each coaxial connector is electrically connected to an opposite end of the transmission line and in sealing contact with the sealing compound.

10. A connector in accordance with claim 9 wherein the sealing compound is a silicone sealing compound.

11. A connector in accordance with claim 10 wherein the silicone sealing compound is a two part, GE-RTV-627 compound.

* * * * *

UNITED STATES PATENT AND TRADEMARK OFFICE
CERTIFICATE OF CORRECTION

PATENT NO. : 7,014,502 B2
DATED : March 21, 2006
INVENTOR(S) : Rasmussen, C. Edward It is certified that error appears in the above-identified patent and that said Letters Patent is hereby corrected as shown below:

<u>Title page,</u>
Item [73], Assignee, change "AnLynk" to -- AnaLynk --.

Signed and Sealed this

Thirteenth Day of June, 2006

JON W. DUDAS
*Director of the United States Patent and Trademark Office*